(12) United States Patent
Wilson

(10) Patent No.: US 10,538,908 B1
(45) Date of Patent: Jan. 21, 2020

(54) TELESCOPING STORM SHELTER

(71) Applicant: Levi Wilson, Oklahoma City, OK (US)

(72) Inventor: Levi Wilson, Oklahoma City, OK (US)

(73) Assignee: LWIP HOLDINGS, LLC, Oklahoma City, OK (US)

( * ) Notice: Subject to any disclaimer, the term of this patent is extended or adjusted under 35 U.S.C. 154(b) by 0 days.

(21) Appl. No.: 15/960,250

(22) Filed: Apr. 23, 2018

Related U.S. Application Data

(60) Provisional application No. 62/488,496, filed on Apr. 21, 2017, provisional application No. 62/489,868, filed on Apr. 25, 2017, provisional application No. 62/533,760, filed on Jul. 18, 2017.

(51) Int. Cl.
| | |
|---|---|
| *E04B 1/346* | (2006.01) |
| *E04B 1/343* | (2006.01) |
| *E04H 9/14* | (2006.01) |
| *A47C 19/22* | (2006.01) |
| *A47C 19/04* | (2006.01) |
| *B66F 3/22* | (2006.01) |

(52) U.S. Cl.
CPC ........ *E04B 1/34305* (2013.01); *A47C 19/045* (2013.01); *A47C 19/22* (2013.01); *E04H 9/14* (2013.01); *B66F 3/22* (2013.01); *E04B 2103/06* (2013.01)

(58) Field of Classification Search
CPC ............. E04B 1/34305; E04B 2103/06; A47C 19/045; A47C 19/22; E04H 9/14; B66F 3/22
USPC .......................................... 52/67, 79.5, 79.1
See application file for complete search history.

(56) References Cited

U.S. PATENT DOCUMENTS

| | | | | |
|---|---|---|---|---|
| 1,095,633 A | * | 5/1914 | Hildeton | A47K 3/325 4/599 |
| 2,538,736 A | * | 1/1951 | Spencer | B60P 3/34 296/171 |
| 2,561,921 A | * | 7/1951 | Guillot | B60P 3/34 254/122 |
| 2,827,004 A | * | 3/1958 | Luce | E04H 9/10 109/1 S |
| 2,944,852 A | * | 7/1960 | Snyder | B60P 3/34 296/171 |
| 3,529,741 A | * | 9/1970 | Tabron | B65D 7/26 220/1.5 |
| 3,539,070 A | * | 11/1970 | Dunlea, Jr. | B64D 1/22 182/142 |

(Continued)

*Primary Examiner* — Basil S Katcheves
(74) *Attorney, Agent, or Firm* — Hall Estill Attorneys at Law; Mitchell K. McCarthy

(57) ABSTRACT

A shelter and associated methodology for operating a shelter that is selectively positionable between an operable raised mode and an idle lowered mode. The shelter has an outer frame with a first upstanding perimeter wall defining an open top. An inner frame has a second upstanding perimeter wall nested within the first upstanding perimeter wall in the lowered mode. Means are provided for raising the inner frame through the outer frame's open top and above the outer frame in the raised mode. The shelter can further include a second inner frame having a third upstanding perimeter wall nested within the second upstanding perimeter wall in the lowered mode. In that case, the means for raising is further configured for raising the second inner frame through the inner frame's open top and above the inner and outer frames in the raised mode.

15 Claims, 20 Drawing Sheets

(56) References Cited

U.S. PATENT DOCUMENTS

| | | | | |
|---|---|---|---|---|
| 3,745,725 A * | 7/1973 | Boucaud | E04B 1/34305 | 254/387 |
| 3,833,954 A * | 9/1974 | Daughenbaugh | B60P 3/34 | 296/171 |
| 3,864,771 A * | 2/1975 | Bauer | B63B 22/22 | 220/8 |
| 4,077,568 A * | 3/1978 | May | F24H 9/02 | 237/8 D |
| 4,358,915 A * | 11/1982 | Pantalone | E04H 12/182 | 52/115 |
| 4,612,779 A * | 9/1986 | Hatton | F25C 5/182 | 241/101.76 |
| 4,674,241 A * | 6/1987 | Sarrazin | E04H 3/165 | 52/67 |
| 4,784,429 A * | 11/1988 | Hodges | B60J 7/041 | 160/202 |
| 4,974,265 A * | 12/1990 | Maggio | A47K 3/325 | 135/901 |
| 5,379,466 A * | 1/1995 | Davies | A47K 3/325 | 4/449 |
| 5,832,676 A * | 11/1998 | Gillmore | E04B 1/3431 | 52/67 |
| 6,910,230 B1 * | 6/2005 | Schimmel | E03D 7/00 | 4/300 |
| 8,596,222 B1 * | 12/2013 | Campbell | A01K 1/0236 | 119/474 |
| 8,695,285 B2 * | 4/2014 | Reinmann, Jr. | E04H 9/16 | 299/12 |
| 9,060,652 B2 * | 6/2015 | Bikker | A47K 4/00 | |
| 9,458,621 B2 * | 10/2016 | Calafatis | E04B 1/34305 | |
| 9,869,083 B2 * | 1/2018 | Gibbons | G05D 27/02 | |
| 2004/0216395 A1 * | 11/2004 | Wentworth, Jr. | B60P 3/34 | 52/79.5 |
| 2005/0284035 A1 * | 12/2005 | DeOvando | E04B 1/3431 | 52/79.1 |
| 2017/0138038 A1 * | 5/2017 | Cueto | E04B 1/34305 | |

* cited by examiner

TELESCOPING STORM SHELTER

RELATED APPLICATIONS

The present application claims the benefit of the earlier filing date of U.S. provisional patent application Ser. No. 62/488,496 filed on Apr. 21, 2017; U.S. provisional patent application Ser. No. 62/189,868 filed on Apr. 25, 2017; and U.S. provisional patent application Ser. No. 62/533,760 filed on Jul. 18, 2017.

FIELD OF TECHNOLOGY

This technology relates to secure storm shelters and other enclosures, and more particularly but without limitation, to storm shelters such as for human protection from environmental or personal safety dangers, and for storage enclosures such as for safekeeping of valuables.

SUMMARY

Some embodiments of this technology contemplate a shelter that is selectively positionable between an operable raised mode and an idle lowered mode. The shelter has an outer frame with a first upstanding perimeter wall defining an open top. An inner frame has a second upstanding perimeter wall nested within the first upstanding perimeter wall in the lowered mode. Means are provided for raising the inner frame through the outer frame's open top and above the outer frame in the raised mode. The shelter can further include a second inner frame having a third upstanding perimeter wall nested within the second upstanding perimeter wall in the lowered mode. In that case, the means for raising is further configured for raising the second inner frame through the inner frame's open top and above the inner and outer frames in the raised mode.

Some embodiments of this technology contemplate a telescoping shelter having a first frame section defining a first enclosure. A second frame section defines a second enclosure sized to fit substantially concentric to and nested within the first enclosure in a telescoped-down mode of the telescoping shelter. A drive is configured to raise the second enclosure above the first enclosure, defining a third enclosure that is substantially the sum of the first and second enclosures.

Some embodiments of this technology contemplate a method including steps of obtaining a storm shelter with an outer frame having a first upstanding perimeter wall defining a first enclosure with an open top, and an inner frame having a second upstanding perimeter wall defining a second enclosure; raising the inner frame through the outer frame's open top and above the outer frame to combine the first and second enclosures into a third enclosure that is substantially the sum of the first and second enclosures; and lowering the inner frame through the outer frame's open top to nest the inner frame within the outer frame.

DRAWINGS

Figure 1:
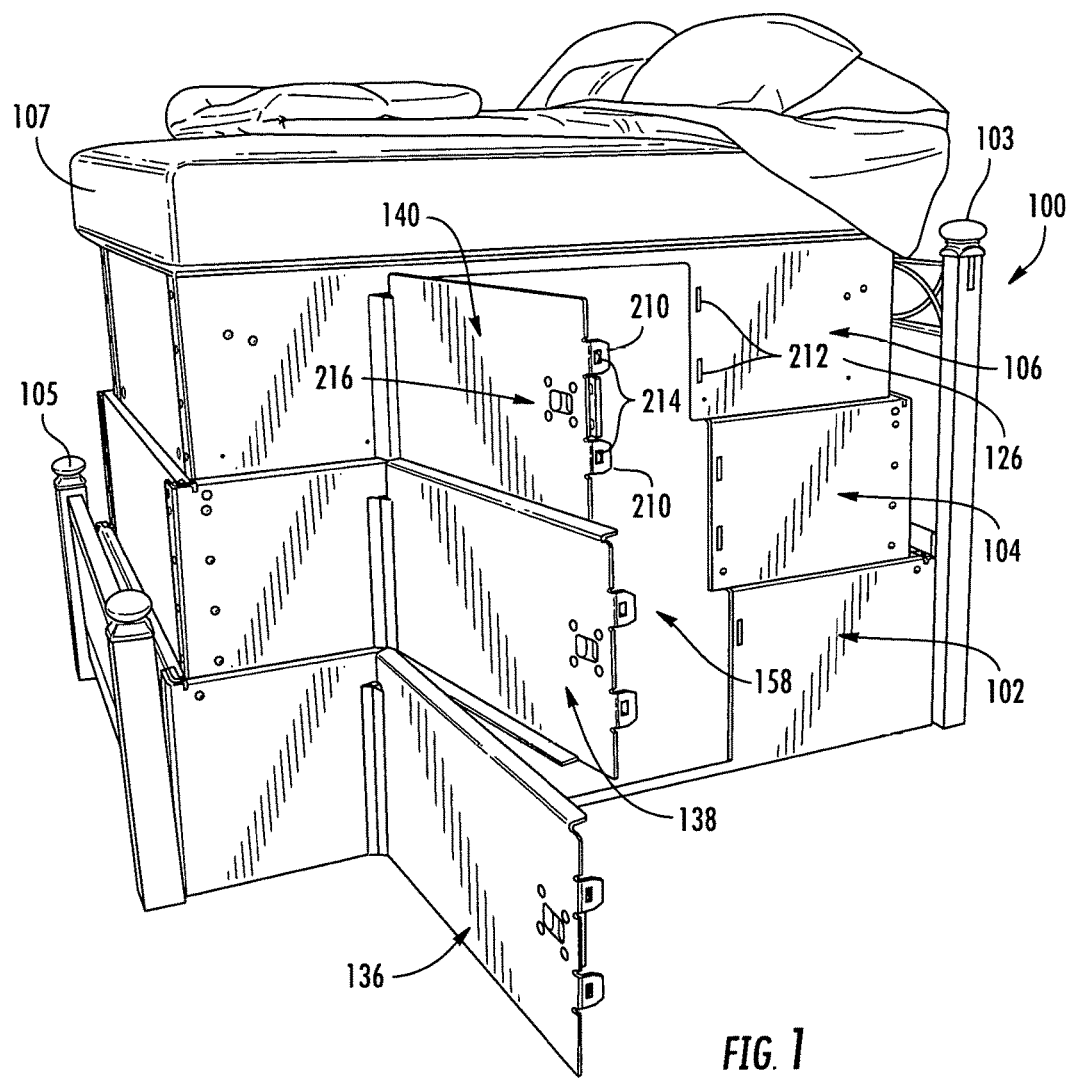
FIG. 1 depicts a telescoping shelter that is constructed in accordance with illustrative embodiments of this technology, selectively placed in a raised mode to provide a secure shelter that is sized for a number of human users or valuables, and alternatively placeable in a lowered mode to provide a bed frame.
Figure 8:
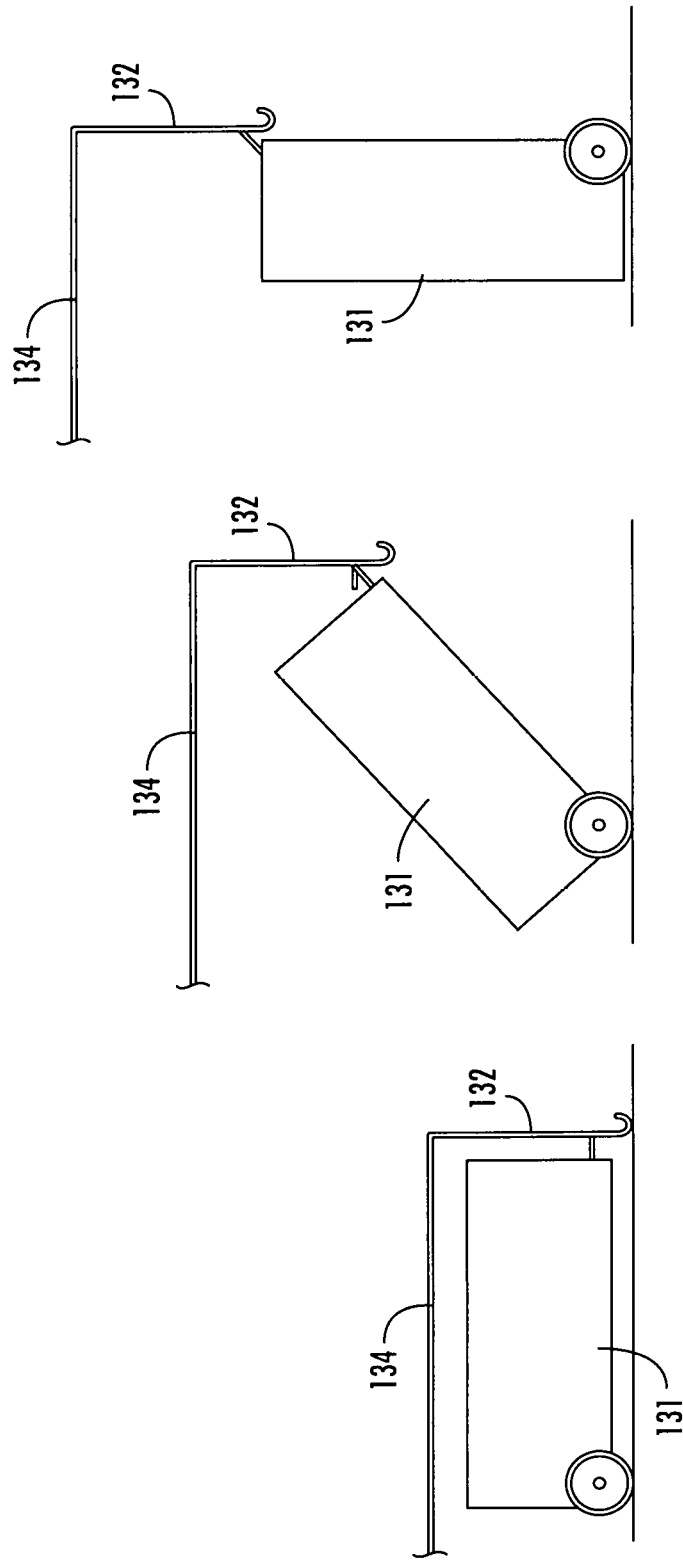

FIG. 8 diagrammatically depicts a rotatable storage container inside the shelter of FIG. 1.

Figure 4:
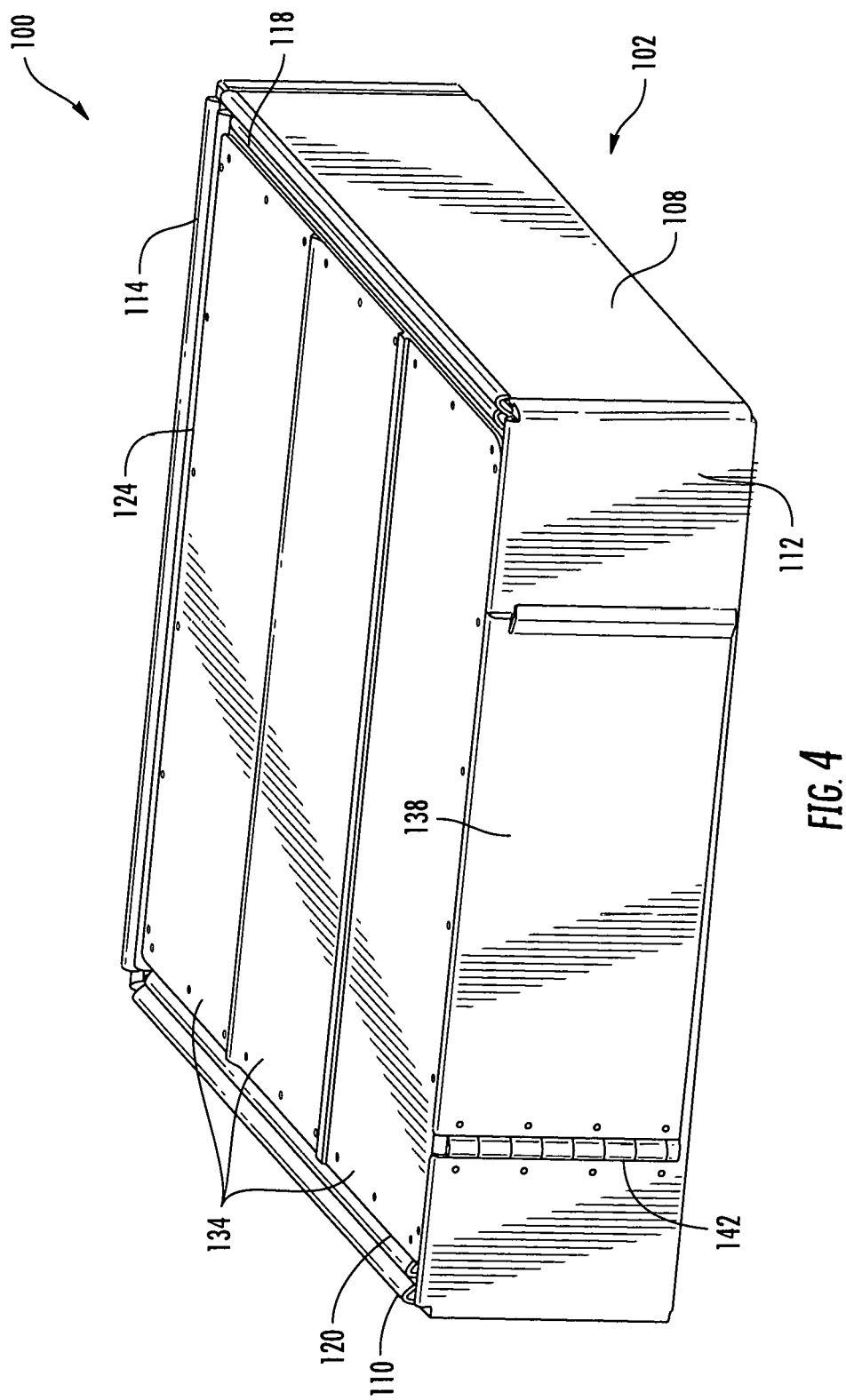
FIG. 4 depicts the shelter of FIG. 2, but selectively placed in the lowered mode.
Figure 9:
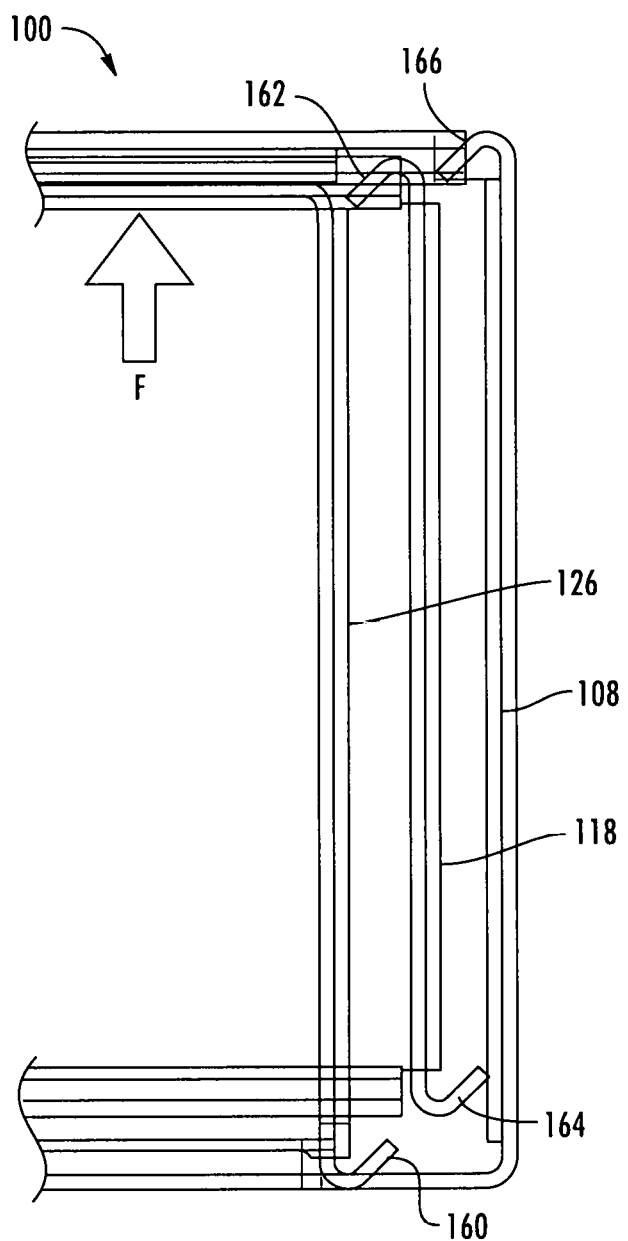

FIG. 9 is a cross-sectional depiction of the right-hand side walls of the shelter of FIG. 4.

Figure 2:
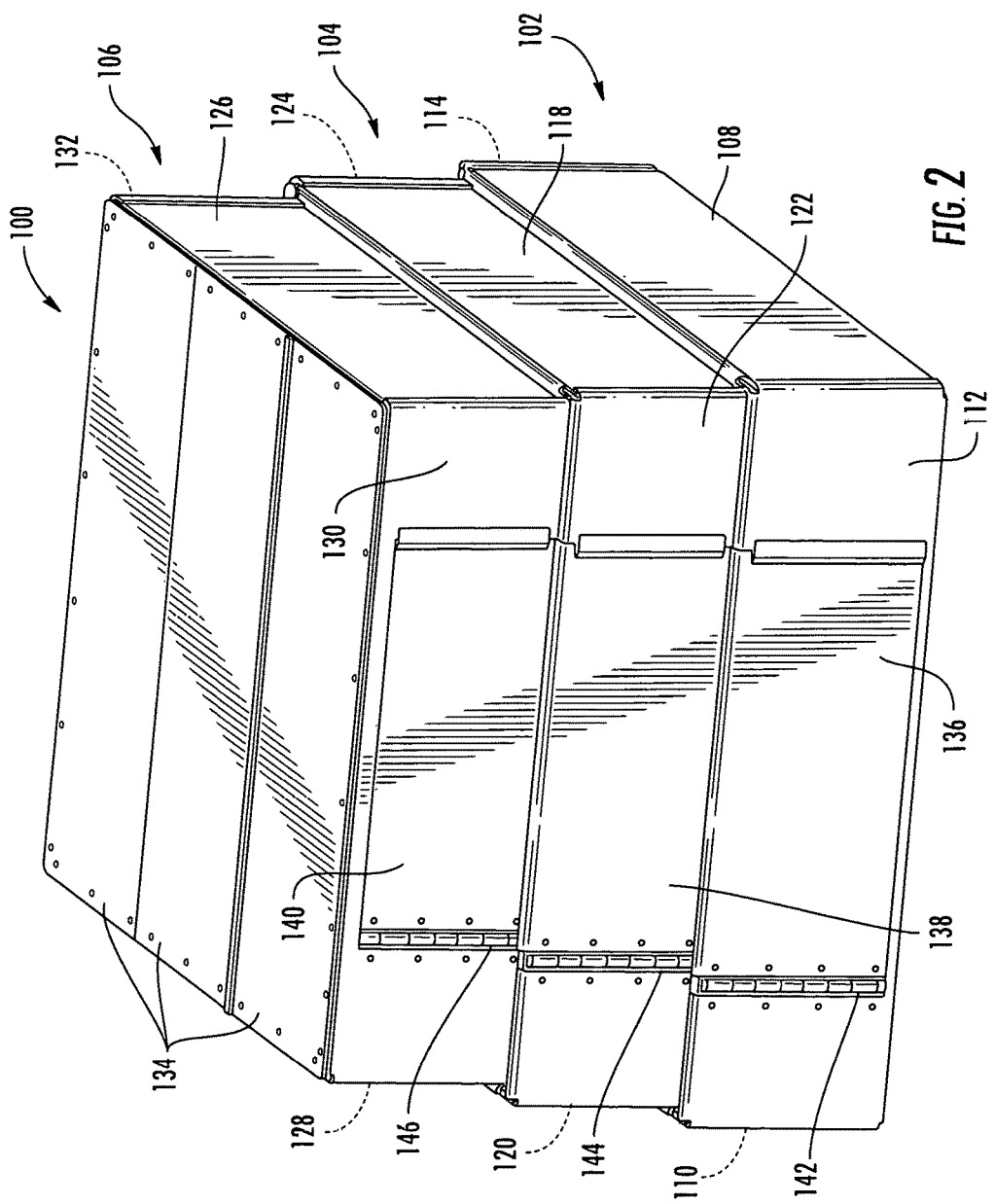
FIG. 2 depicts an alternative construction to the shelter of FIG. 1 in which the access doors and openings are in the end walls instead of the side walls.
Figure 10:
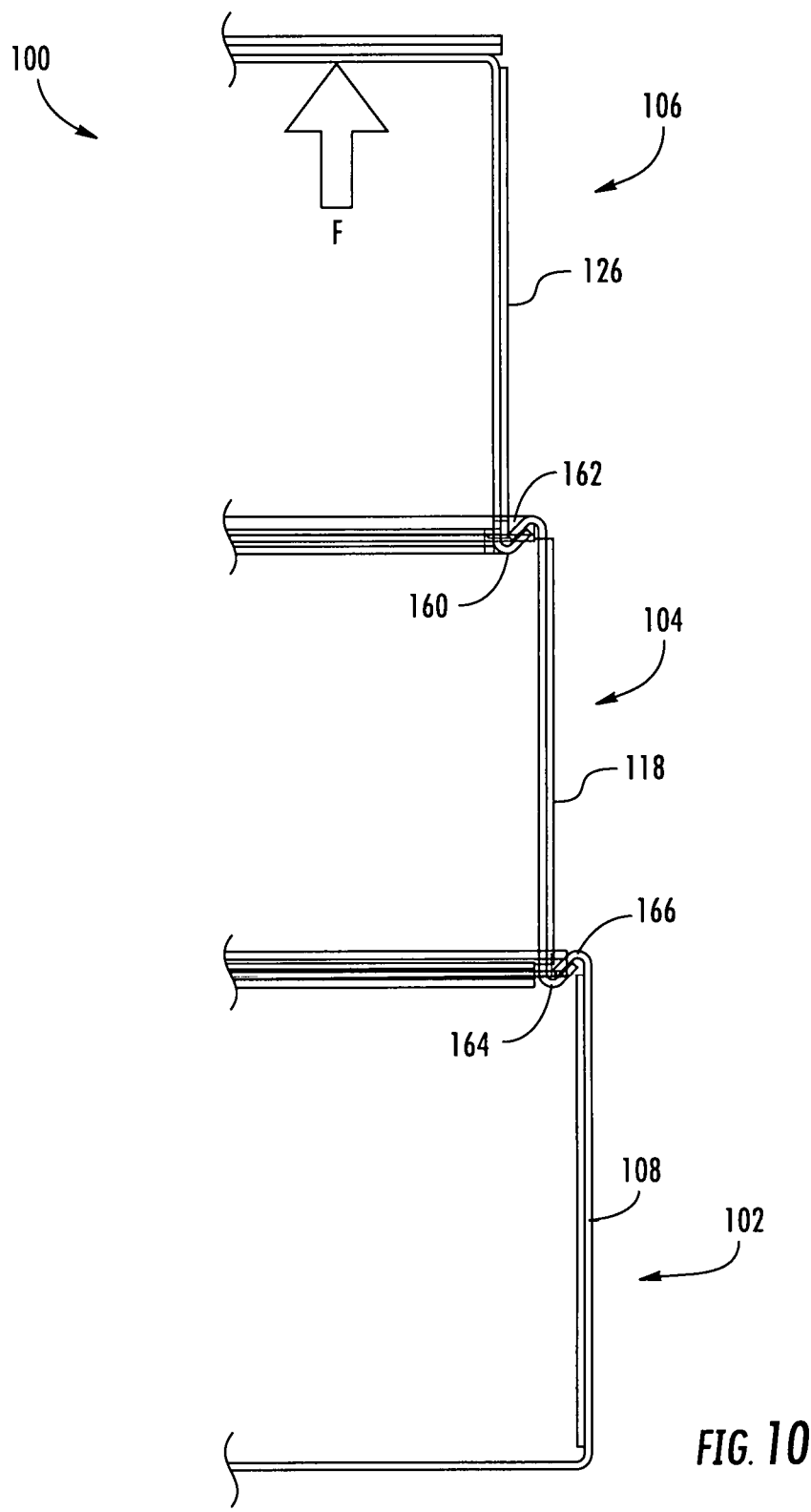

FIG. 10 is a cross-sectional depiction of the side walls of FIG. 9 but with the shelter in the raised mode of FIG. 2.

Figure 11:
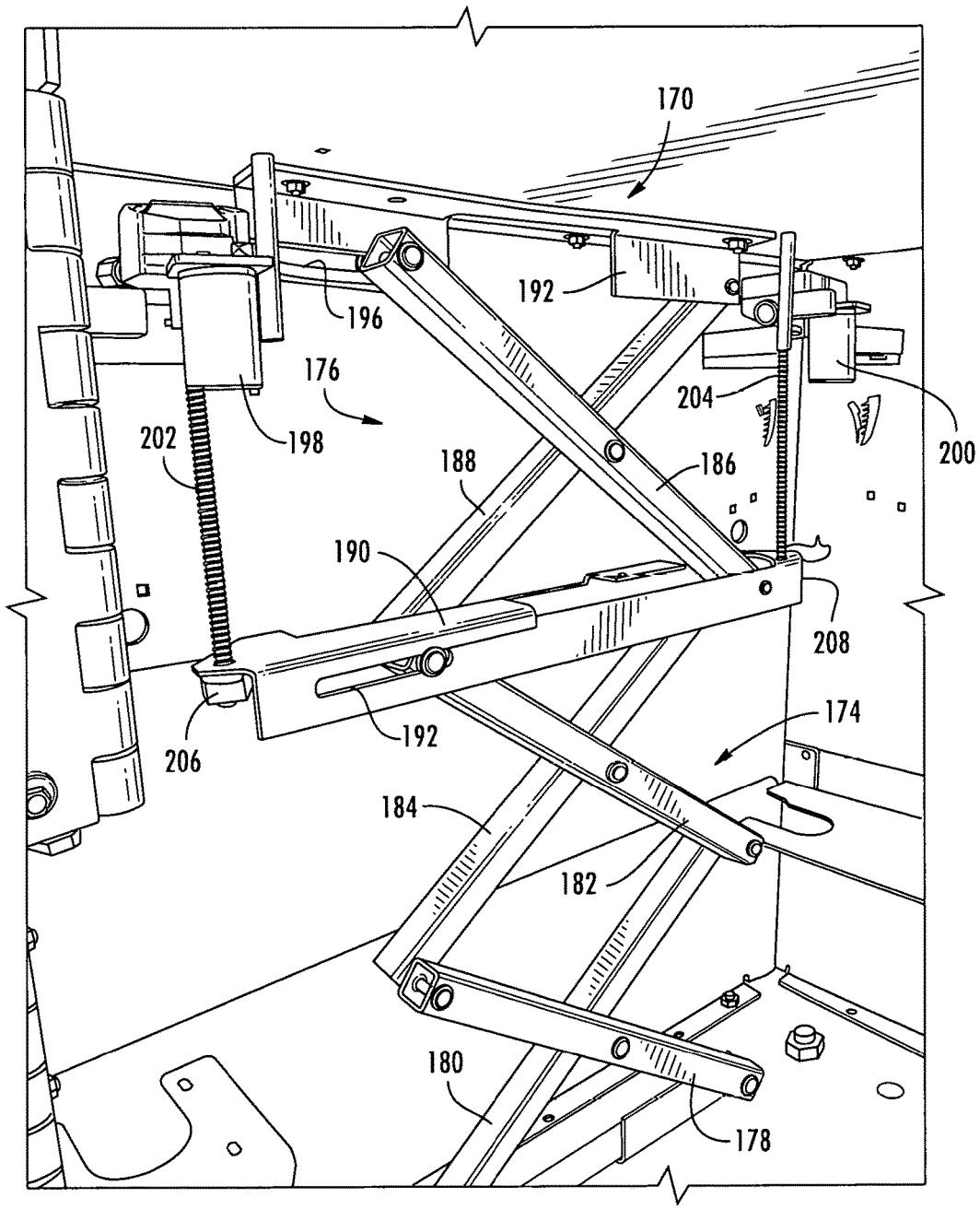

FIG. 11 depicts a lift mechanism that is constructed in accordance with illustrative embodiments of this technology.

Figure 12:
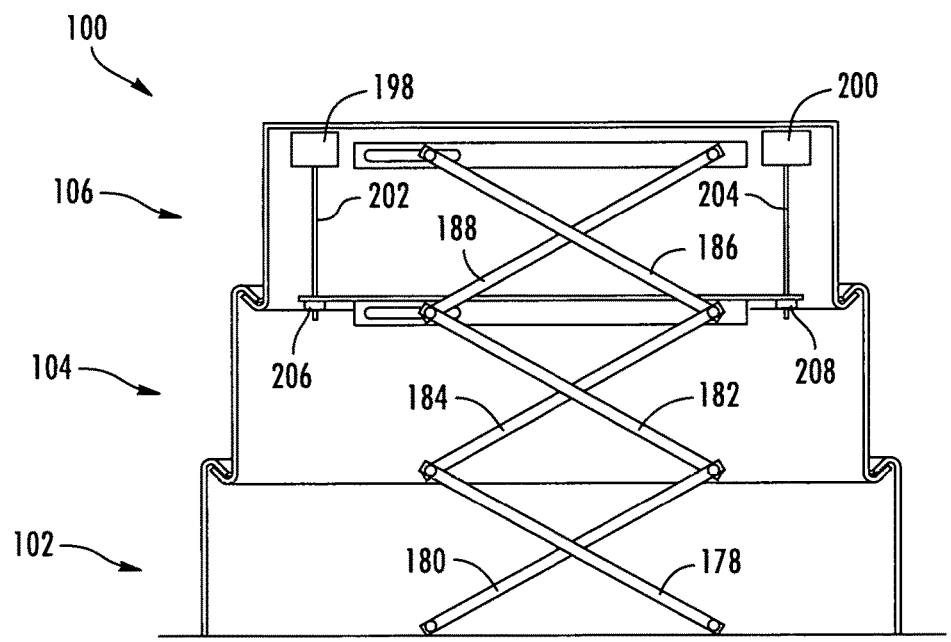

FIG. 12 is a simplified diagrammatic depiction of the shelter lift mechanism of FIG. 10.

Figure 13:
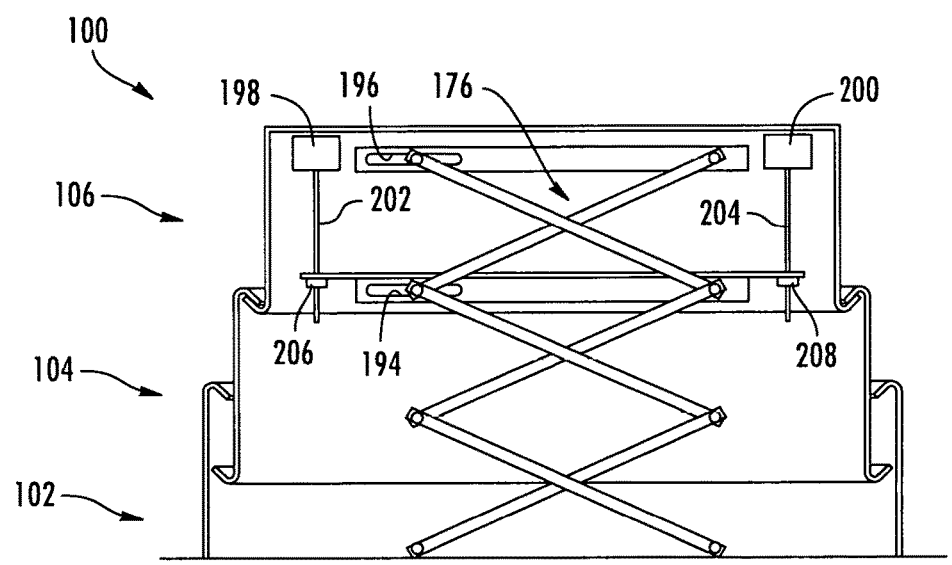

FIG. 13 is similar to FIG. 12 but depicting a partially-lowered mode of the shelter where the middle section is lowering through the open-top of the bottom section.

Figure 14:
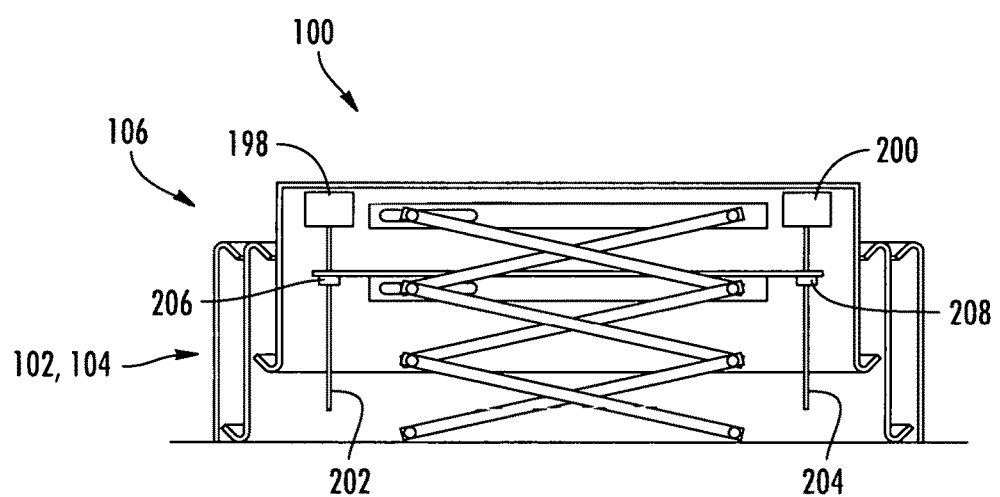

FIG. 14 is similar to FIG. 13 but depiction further lowering of the top section through the open-top of the middle section.

Figure 15:
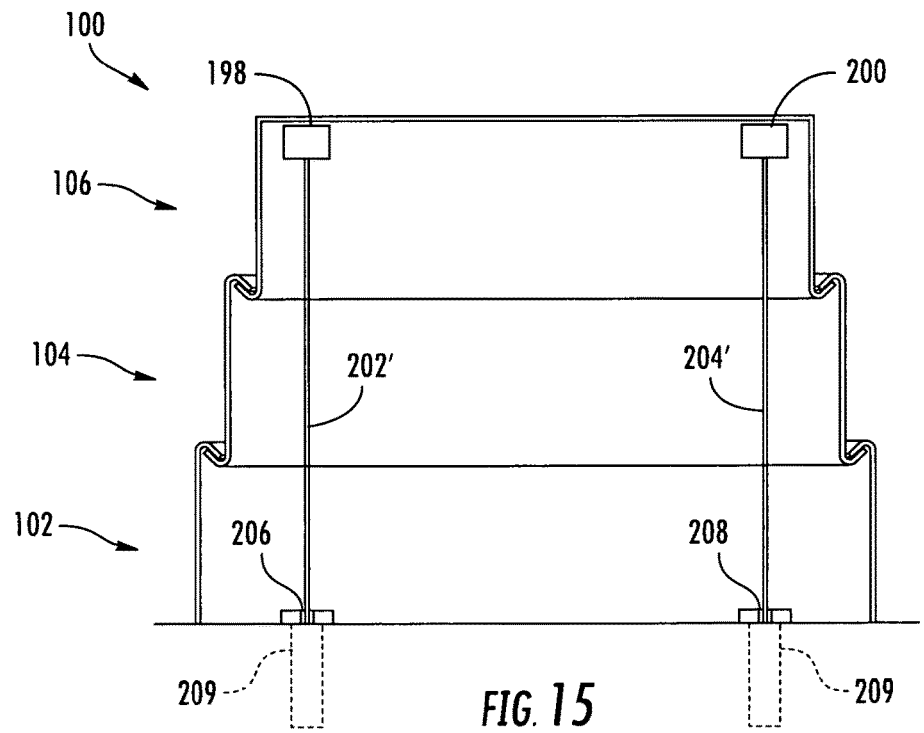

FIG. 15 is a simplified diagrammatic depiction of a lifting mechanism constructed in accordance with alternative embodiments of this technology.

Figure 16:
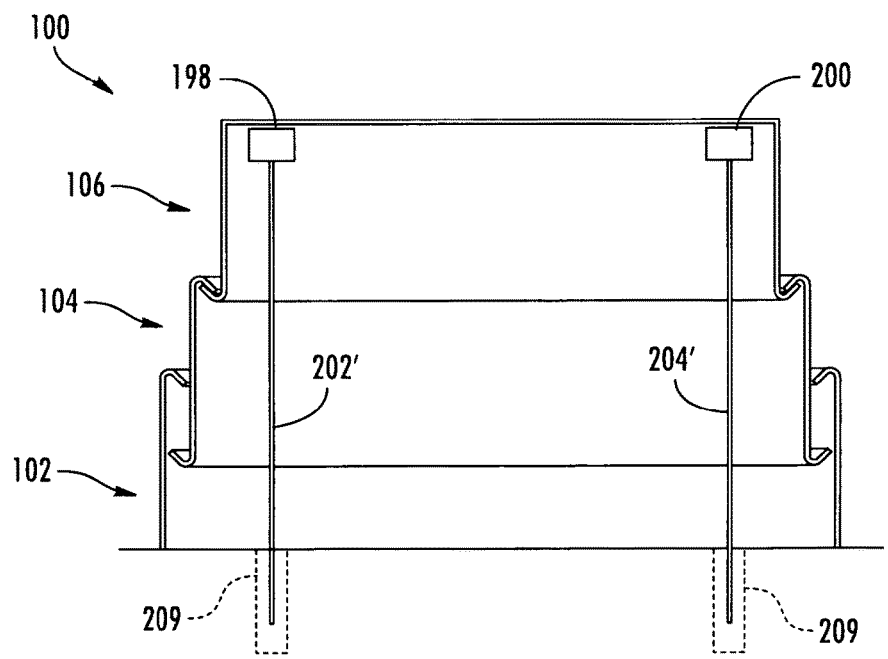

FIG. 16 is similar to FIG. 15 but depicting the shelter being partially lowered.

Figure 17:
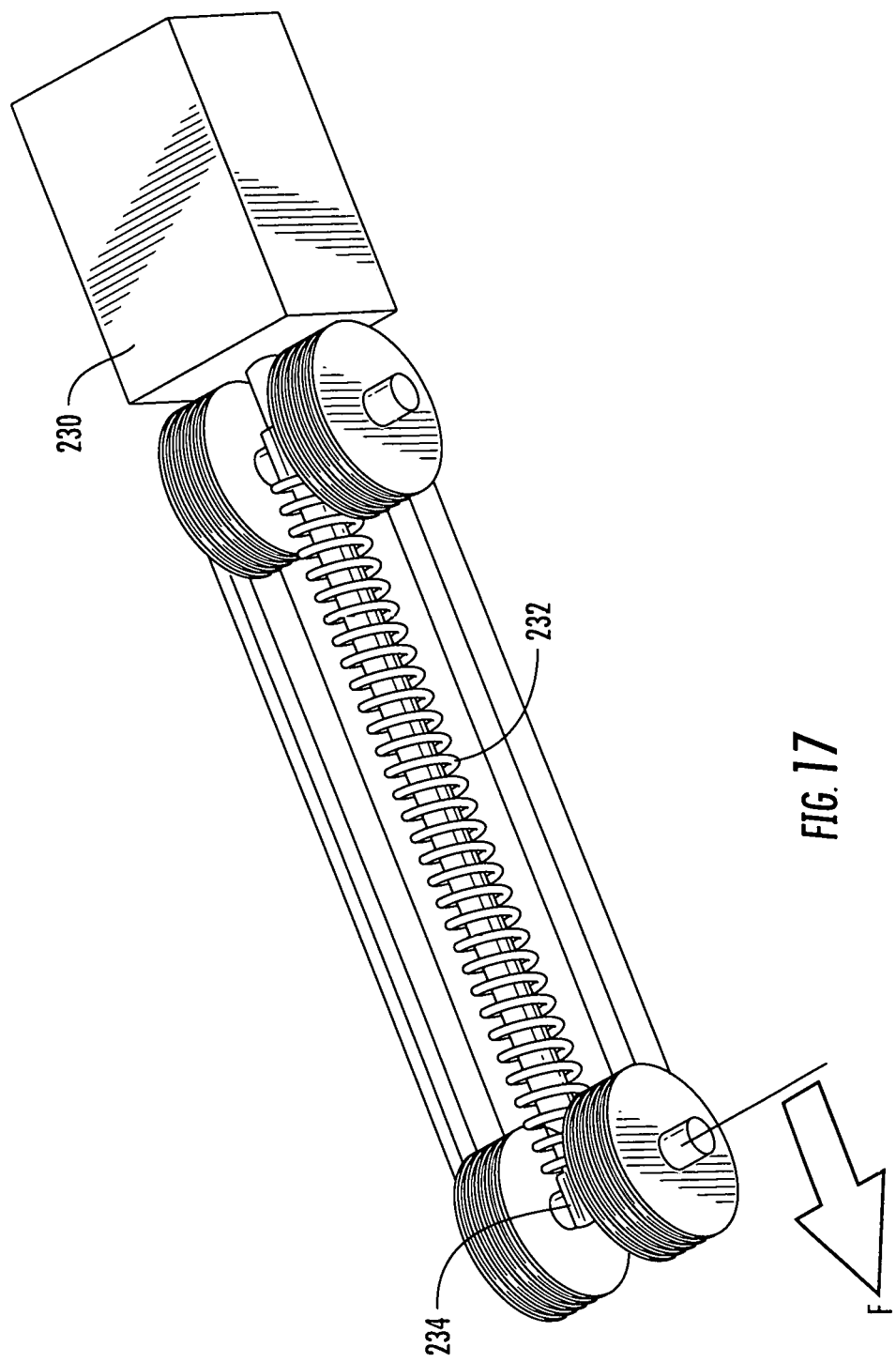
Figure 18:
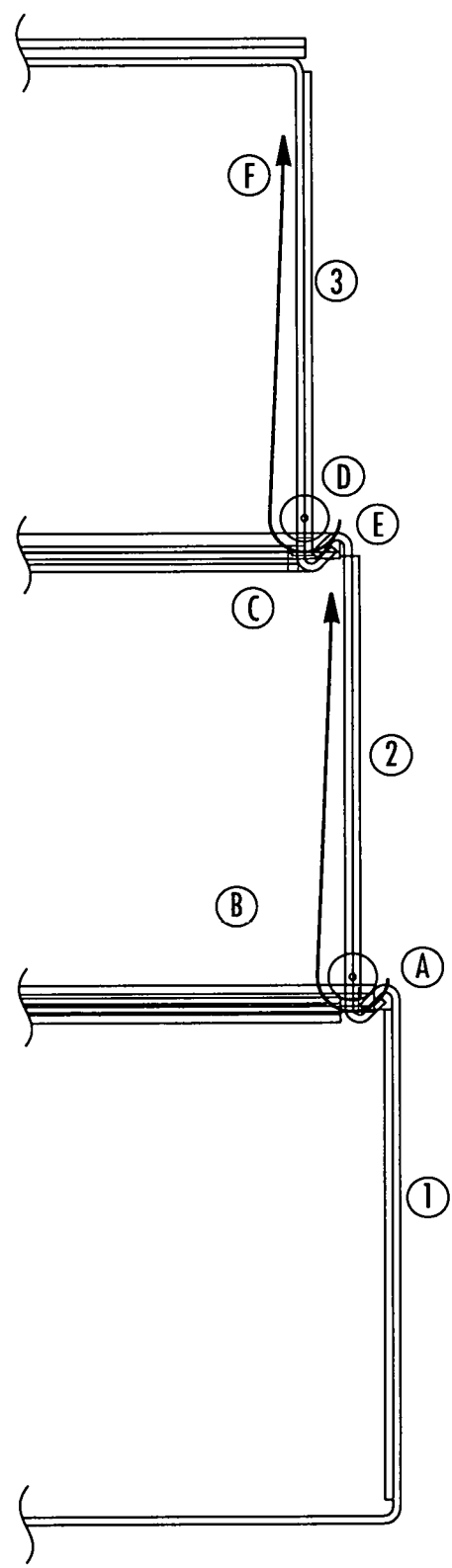

FIGS. 17 and 18 are simplified diagrammatic depictions of another lifting mechanism constructed in accordance with illustrative embodiments of this technology.

Figure 19:
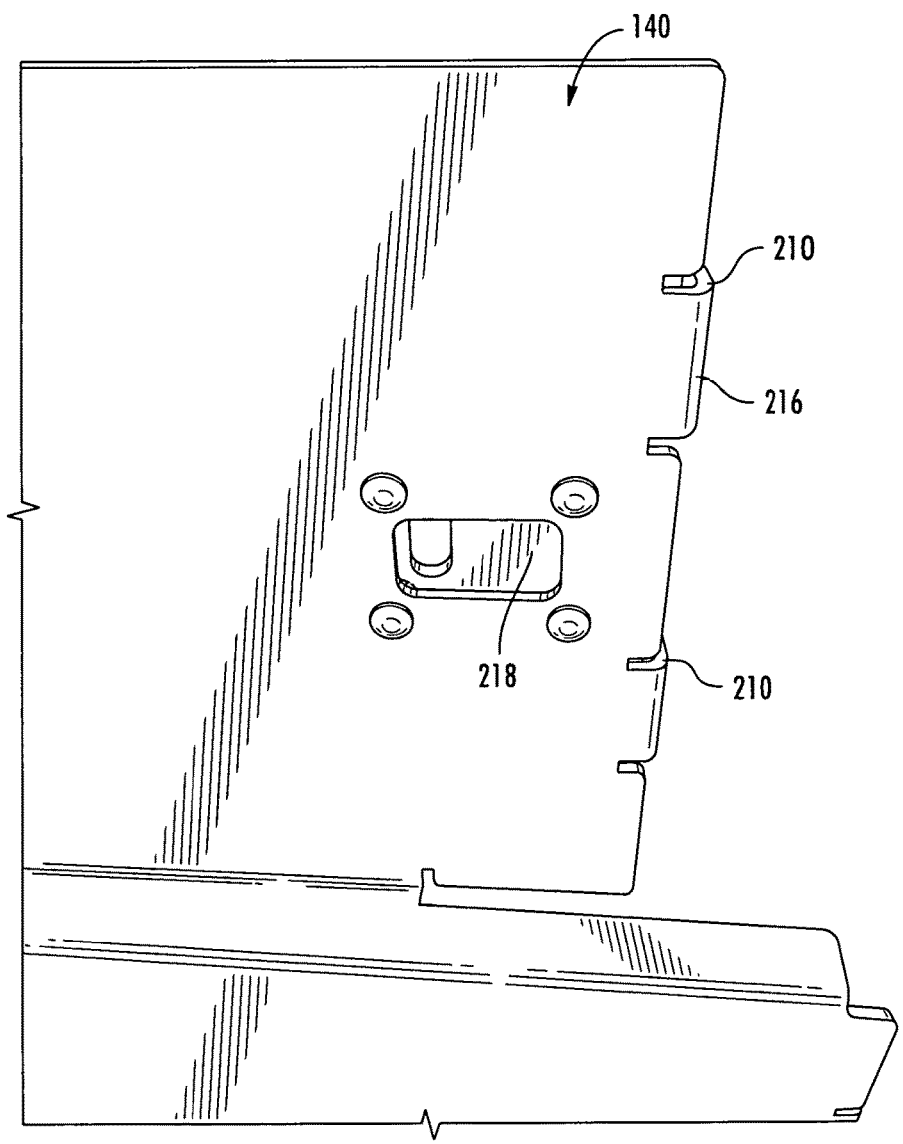

FIG. 19 depicts the door latching mechanism in the unlatched position.

Figure 20:
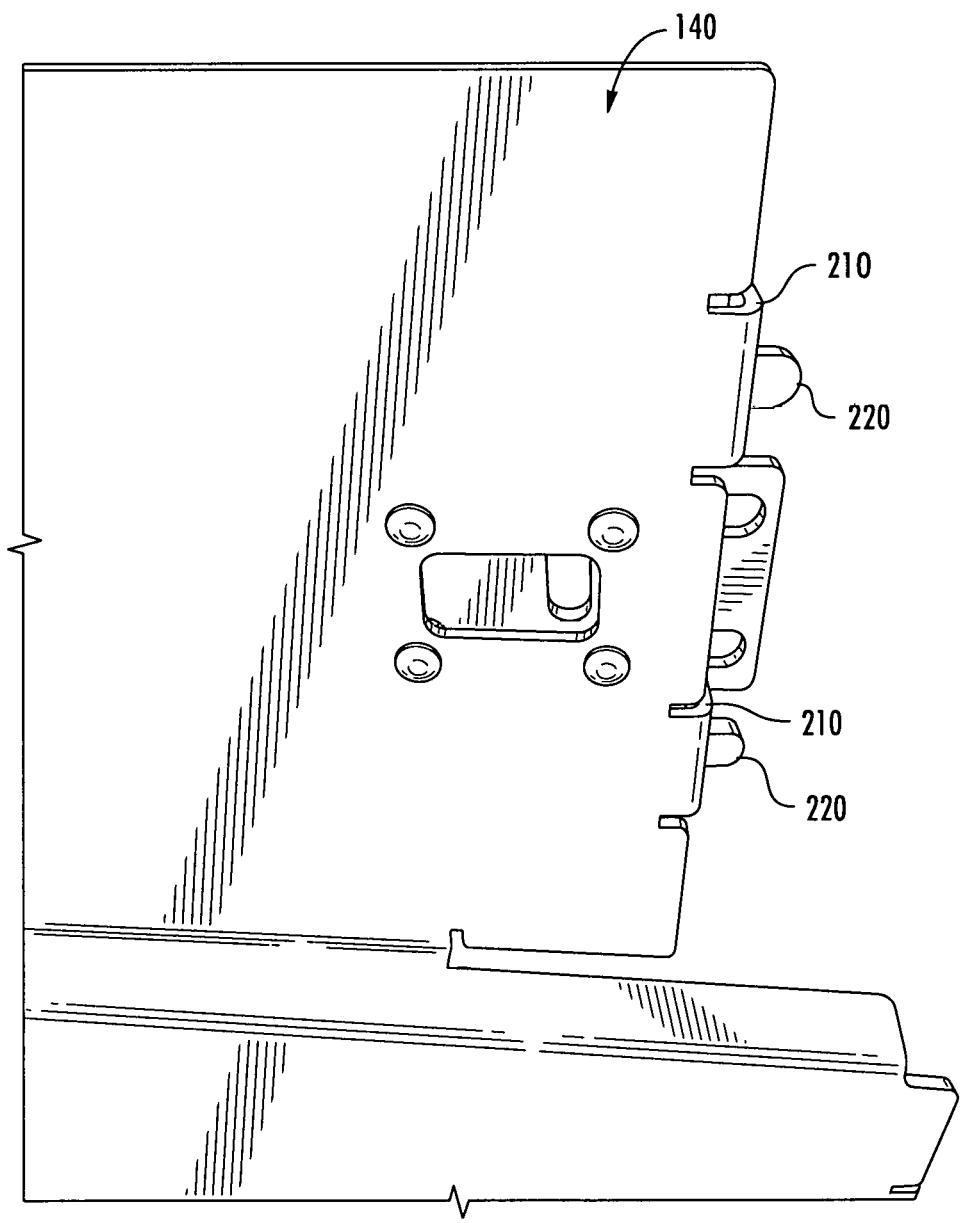

FIG. 20 depicts the door latching mechanism in the latched position.

Figure 21:
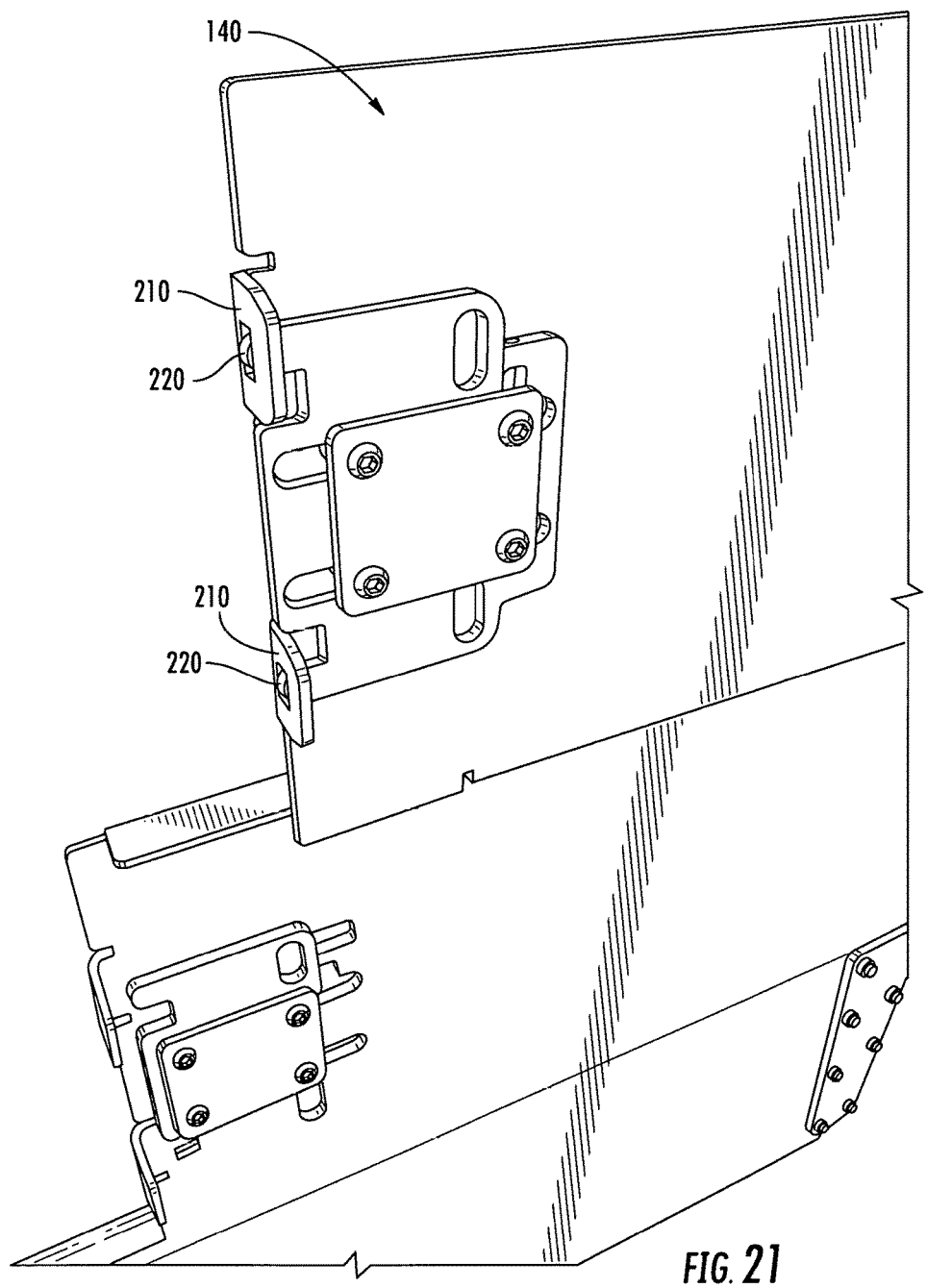

FIG. 21 depicts the back-side of the latching mechanism of FIGS. 17 and 18.

Figure 22:
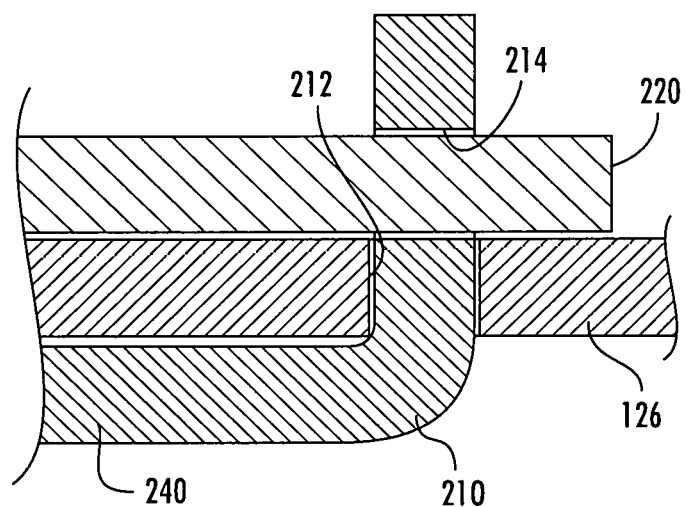

FIG. 22 is a cross-sectional depiction of the latching mechanism in the latched position.

DESCRIPTION

Initially, this disclosure is by way of example only, not by limitation. The illustrative constructions and associated methods disclosed herein are not limited to use or application with any specific device or in any specific environment. That is, the disclosed technology is not limited to usage for providing a shelter that is otherwise concealed as a bed frame as is disclosed in the illustrative embodiments. Thus, although the instrumentalities described herein are for the convenience of explanation, shown and described with respect to exemplary embodiments, the skilled artisan understands that the principles herein may be applied equally in other types of systems and environments where a human shelter is otherwise concealed as something other than a bed frame such as a game table, a cabinet, a desk, an executive table, a workbench, a kitchen island, and the like, and also involving the provision of an enclosure for non-human articles such as a concealed safe or food pantry, and the like.

FIG. 1 depicts a telescoping shelter 100 that is constructed in accordance with illustrative embodiments of this technology to include three telescoping sections; a bottom section 102, a middle section 104, and a top section 106. In this depiction, the shelter 100 has been raised by a lifting mechanism, described below. In this raised mode, doors 136, 138, 140 can be opened to provide an opening 158. The shelter 100, in this raised mode, is sized and constructed to provide a secure enclosure for several adult human users, who can enter via the opening 158. Once inside, the users can close the doors 136, 138, 140 and securely latch them to close the secure enclosure around them.

The lifting mechanism can be operated to lower the middle section 104 and the top section 106 into a nested, concentric relation within the bottom section 102. In the lowered mode (not depicted), the bottom section 102 is sized and constructed to function as a bed frame. Particularly, the bottom section 102 is configured for attaching a headboard 103 at one end and for attaching a footboard 105 at the opposing end. The top section 106 has a top-end surface suited for supporting a mattress 107 and the expected weight of humans using it for a bed.

Figure 3:
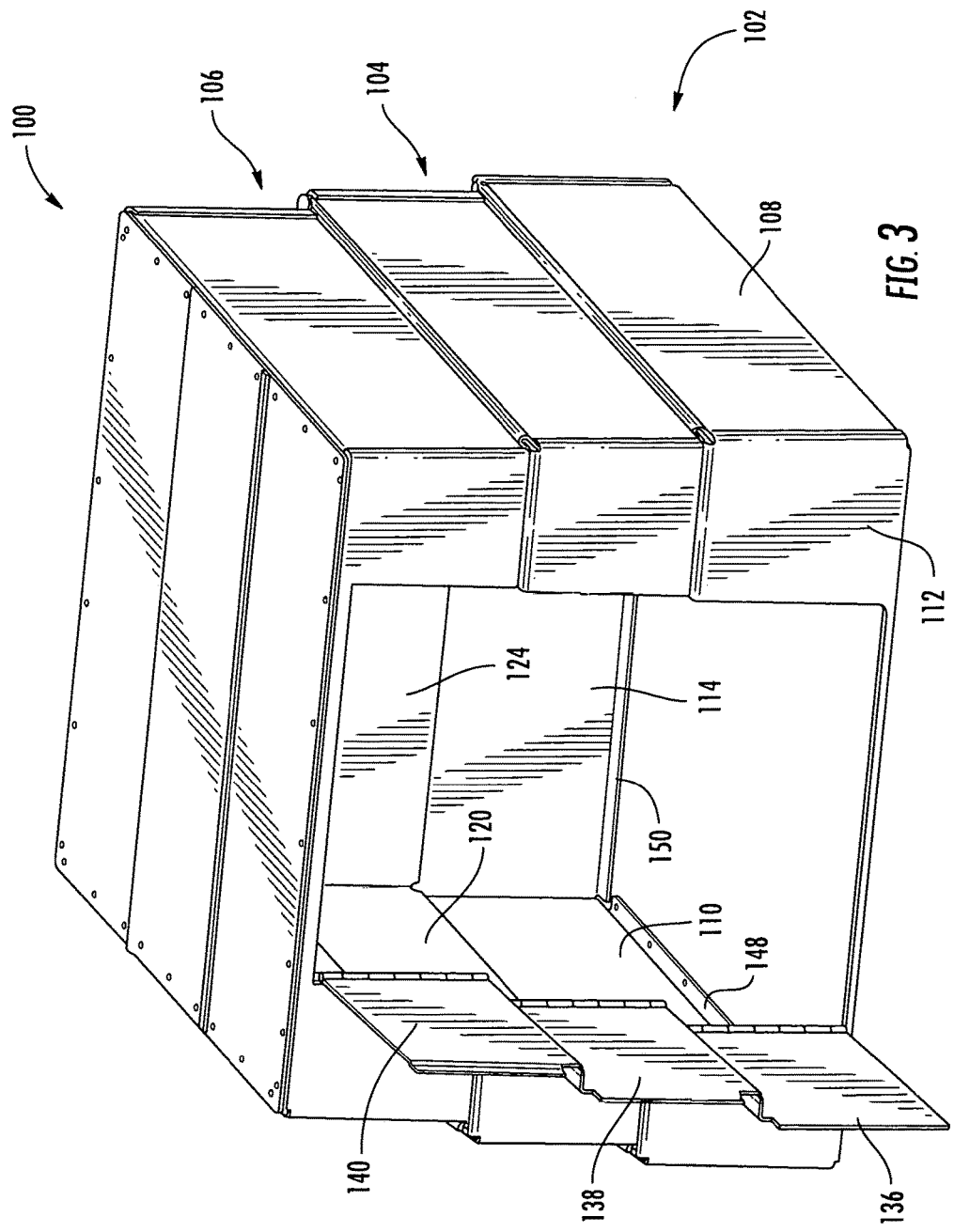
FIG. 3 depicts the shelter of FIG. 2 with the doors opened for users to enter or exit the shelter.

FIGS. 2-4 depict the shelter 100 itself in the raised mode (FIGS. 2 and 3) and in the lowered mode (FIG. 4). As described, the shelter 100 in these illustrative embodiments is constructed of three telescoping sections 102, 104, 106, but the contemplated embodiments are not so limited. In other embodiments, there can be only two sections or there can be more than three sections. Also, in these illustrative embodiments the bottom section 102 is the largest of the three, with the other two sections 104, 106 lowering inside the largest bottom section. In alternative contemplated embodiments the reverse can be true, the bottom section can be the smallest of the three sections with the other two sections lower outside the smallest bottom section.

Returning to the illustrative embodiments depicted in FIGS. 2-4, the bottom section 102 is an outermost frame forming a rectangular perimeter wall constructed by joining opposing side wall members 108, 110 to opposing end wall members 112, 114. Although the illustrative embodiments depict a rectangular shape, the contemplated embodiments are not so limited. Alternatively, the frames of this technology can be virtually any shape such as square, round, polygonal, and the like. The middle section 104 is an inner frame forming a slightly smaller square perimeter wall constructed by joining, in similar fashion, opposing wall members 118, 120 to opposing end wall members 122, 124. Likewise, the top section 106 is an innermost frame having yet another slightly smaller square perimeter wall constructed by joining opposing side wall members 126, 128 to opposing end wall members 130, 132. The bottom and middle sections 102, 104 have open tops, but the top section is closed by attaching panels 134 to the innermost frame perimeter wall members 126, 128, 130, 132.

Structural rigidity is imparted to the bottom section 102 by securing it to a foundation, such as anchoring it to the concrete slab of a house or building structure. This is typical when using the shelter 100 as a storm shelter. Structural rigidity is similarly imparted to the top section 106 by attaching the panels 134 to close its top. The middle section 104, however, is neither anchored at its bottom nor closed at its top, so it can be advantageous to impart additional rigidity to it by an enhanced corner construction.

Figure 5:
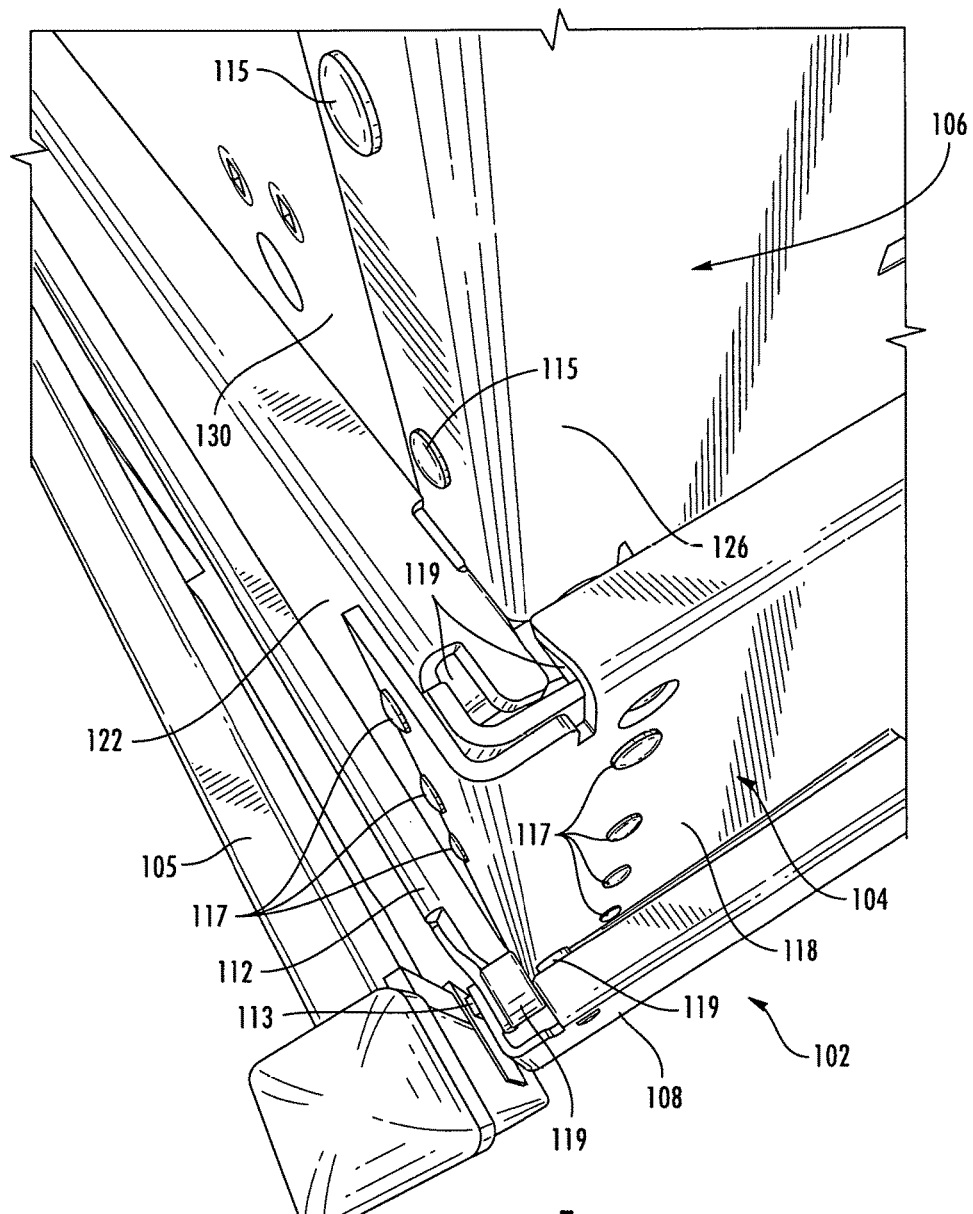
FIG. 5 depicts corner constructions of the telescoping sections of the shelter of FIG. 1.

FIG. 5 depicts the joinder of the side wall 108 to the end wall 112 in the shelter 100 of FIG. 1. Generally, although the illustrative embodiments describe a bolted-together construction, the contemplated embodiments are not so limited. The wall members can be joined at their corners in any other suitable manner as well such as welding, clamping, upsetting, fastening, and the like. For purposes of the illustrative bolted-together embodiments, the bottom section 102 corners are constructed by overlapping the side and end walls and bolting them together in just one plane. For example, side wall 108 forms a right-angle flange that overlaps the end wall 112, and threaded fasteners 113 join them together along one plane of attachment. In the same manner for the top section 106, the side wall 126 forms a right-angle flange that overlaps the end wall 130, and threaded fasteners 115 join them together alone one plane of attachment. The middle section 104, however, is strengthened by attaching the side and end walls along two planes of attachment. Particularly, the side wall 118 forms a right-angle flange that overlaps the end wall 122, and the end wall 122 forms a right-angle flange that overlaps the side wall 188, and threaded fasteners 117 join both of the overlapped portions together along two different planes of attachment. FIG. 5 also depicts a number of polymeric guides 119 that are secured between adjacent side walls. The guides 119, such as of Nylon, provide a lubricious sliding engagement of the sections 102, 104, 106 sliding past one another during raising and lowering of the shelter 100. The other three corners in each of the sections 102, 104, 106 can be joined and guided in like manner.

Returning to FIGS. 2-4, in these illustrative embodiments the doors 136, 138, 140 swing on respective hinges 142, 144, 146. As best depicted in FIG. 2, the hinges 142, 144, 146 are staggered so that each door swings clear of the door (or doors) beneath it. FIG. 3 depicts the doors 136, 138, 140 having been unlatched and swung open, permitting access to and egress from the shelter 100. FIG. 3 also depicts the wall members 110, 114 in the bottom section 102 have respective flanges 148, 150 with openings for anchoring the shelter 100 to a foundation, such as to a concrete slab in a building or house structure. Although not depicted, the other two wall members 108, 112 preferably have like flanges for the same purpose.

FIG. 4 depicts the same perspective of the shelter 100 as FIGS. 2 and 3, but in the lowered mode in which it takes up much less space in the room it occupies. In this lowered mode, the shelter can be sized for some other useful purpose than being a secure shelter, such as providing the bed frame of FIG. 1, or a table, a kitchen island, a pool table or some other game table, and the like. The telescoping structure provides a fast and robust transition between the raised mode depicted in FIGS. 2 and 3 and the lowered mode depicted in FIG. 3. Particularly, the top section 106 is sized so that it can be lowered or raised through the open top of the middle section 104, and both of those sections can be lowered or raised through the open top of the bottom section 102.

Figure 6:
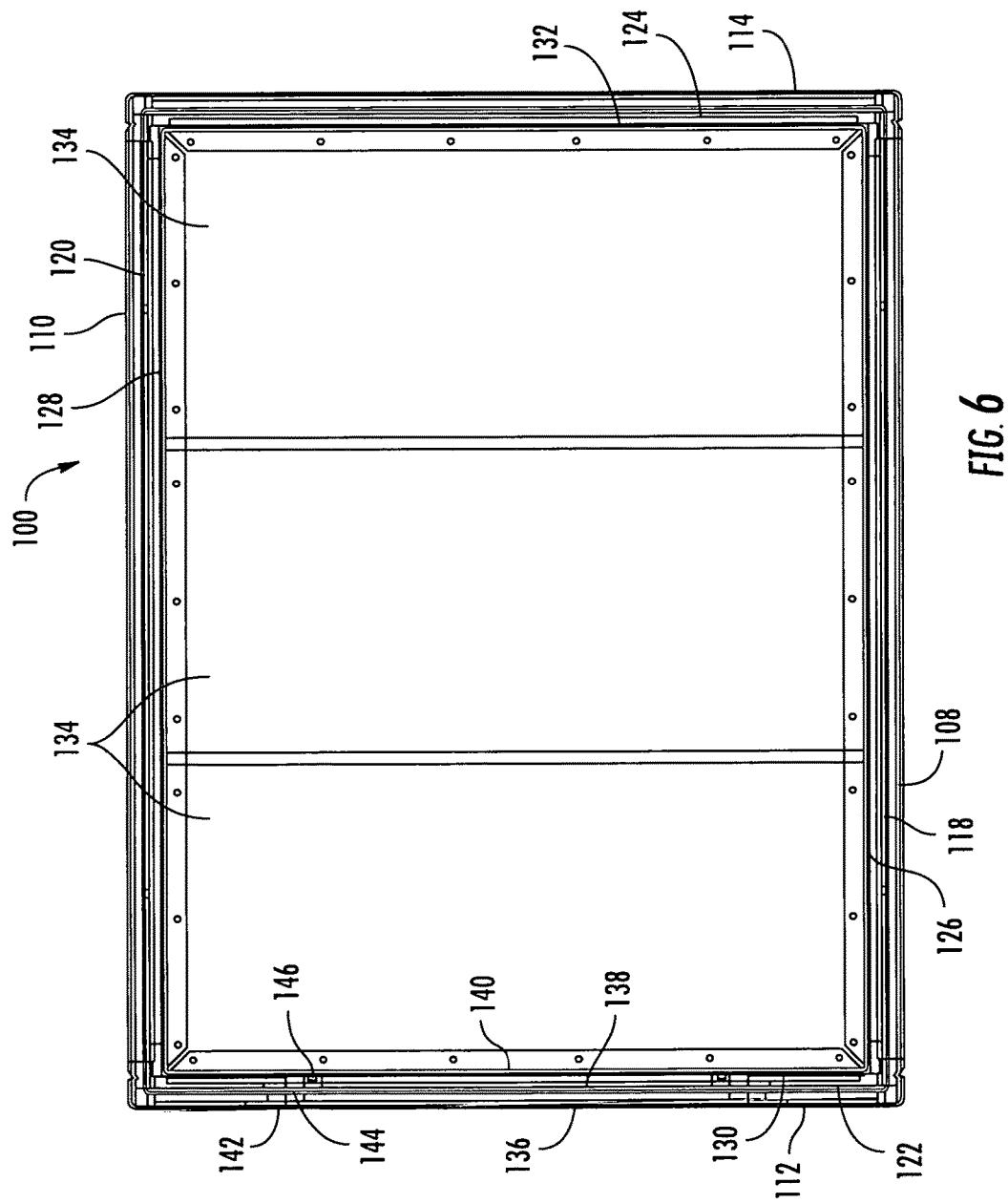
FIG. 6 is a top depiction of the shelter of FIG. 4.

FIG. 6 is a top depiction of the shelter 100 in the lowered mode, as described above in relation to FIG. 4. This better depicts how the bottom section 102 is an outer frame having the opposing wall members 108, 110 joined to the opposing side wall members 112, 114, effectively forming an upstanding rectangular perimeter wall with an open top. Likewise, the middle section 104 is an inner frame having the opposing side wall members 118, 120 joined to the opposing end wall members 122, 124, forming another upstanding rectangular perimeter wall with an open top, concentrically nested within the bottom section 102. Similarly, the top section 106 is an innermost frame having the opposing side wall members 126, 128 joined to the opposing end wall members 130, 132, likewise concentrically nested within the bottom section 102 and the middle section 104. In these illustrative embodiments, the closely-mating nested frames cooperatively form the vertical walls of the shelter 100 in the raised mode, maximizing the amount of space inside the enclosure.

Figure 7:
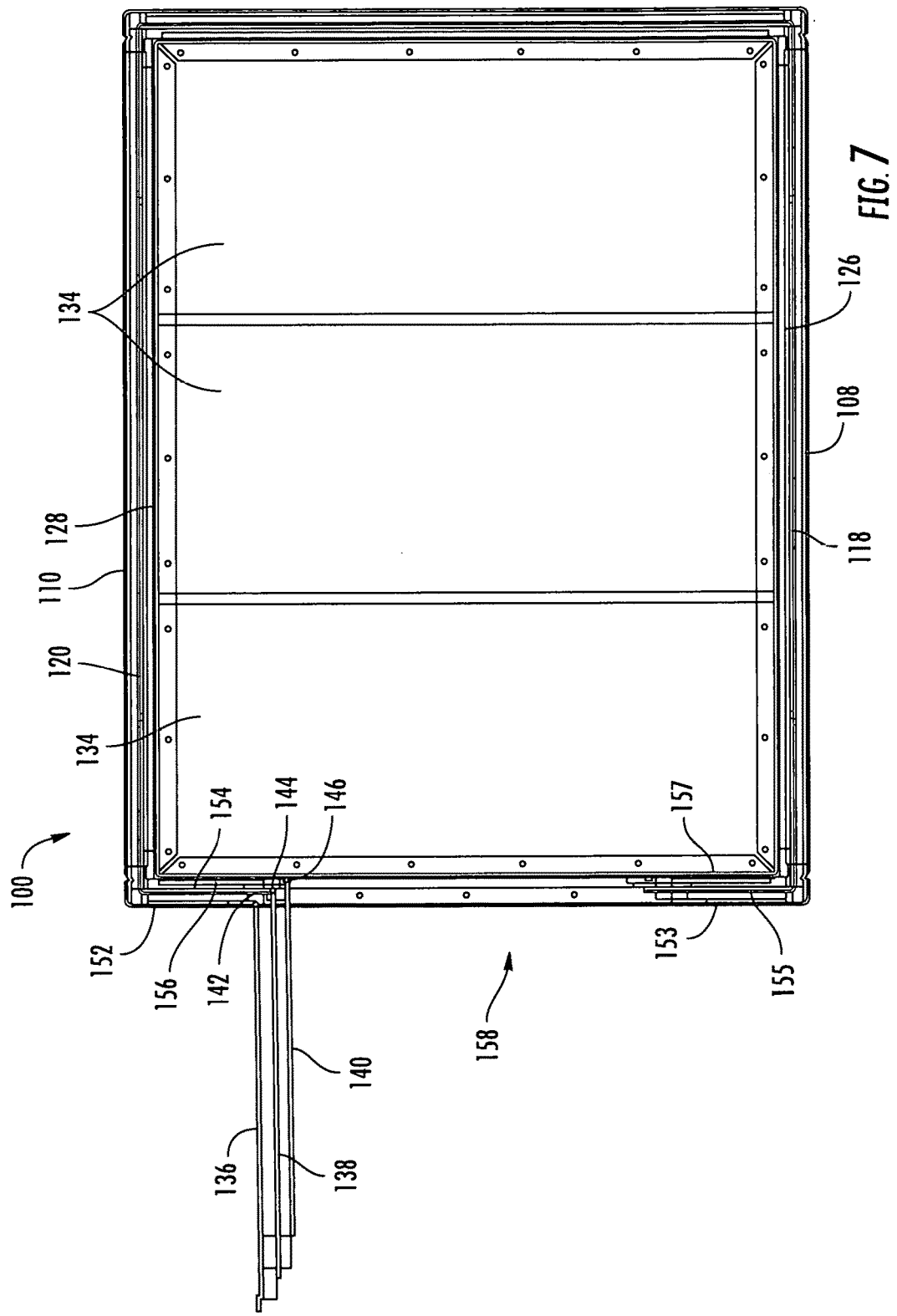
FIG. 7 is the top depiction of FIG. 6 but with the doors opened.

FIG. 7 is similar to FIG. 6 except that the overlapping doors 136, 138, 140 are opened, affording access to only the volume of the innermost top section 106. Access to just that space, though, can be used for storing items when the shelter 100 isn't being used. FIG. 8 depicts a two-wheeled container 131 that can be placed inside that space to store items, much like a gun safe, for example. The container 131 can be useful for storing other items such as oxygen tanks and medical supplies, and the like, essentials that could be useful to the occupants of the shelter 100 when it becomes necessary to use it. The container 131 can be connected at one end to the end wall 132 of the top section 106, and supported on wheels or the like at the other end. Alternatively, the container 131 could be connected to the top portion 134 of the top section 106. As the shelter 100 is raised, the end wall rotates the container 131 to an upright position and tucks it closely to the end wall of the shelter 100 enclosure to maximize the space for occupants inside the enclosure.

Returning to the illustrative construction depicted in FIG. 7, the end wall 112 (FIG. 6) of the lower section 102 is depicted in FIG. 7 as having bottom subwalls 152, 153 forming the opening 158 therebetween. The bottom door 136 is attached, via the hinge 142, to the bottom sub-wall 152 that is, in turn, joined to the bottom side wall 110. The bottom door 136 closes against and latches to the bottom subwall 153 that is, in turn, joined to the opposing bottom side wall 108.

Similarly, the end wall 122 (FIG. 6) of the middle section 104 is depicted in FIG. 7 as having middle subwalls 154, 155 forming the opening 158 therebetween. The middle door 138 is attached, via hinge 144, to the middle subwall 154 that is joined, in turn, to the middle side wall 120. The middle door 138 closes against and latches to the opposing middle subwall 155 that is, in turn, joined to the opposing middle side wall 118. The middle subwall 154 is longer than the bottom subwall 152, so that the middle hinge 144 extends into the opening 158 farther than the bottom hinge 142. That enables the middle door 138 to swing open without obstruction from the bottom hinge 142 or the opened bottom door 136. Similarly, the middle subwall 157 is longer than the bottom subwall 153 so that the middle door 138 swings clear of the bottom subwall 153 before closing against the middle subwall 155.

Finally, and in like manner, the top end wall 130 of the top section 106 is depicted in FIG. 7 as having top subwalls 156, 157 forming the opening 158 therebetween. The top door 140 is attached, via hinge 146, to the top subwall 156 that is joined, in turn, to the top side wall 128. The top subwall 156 extends into the opening 158 farther than the middle subwall 154, so that the top door 140 swings clear of the middle hinge 144 and the opened middle door 138. The top door 140 closes against and latches to the opposing top subwall 157 that is, in turn, joined to the opposing top side wall 126. The top subwall 157 is longer than the middle subwall 155 so that the top door 140 swings clear of the middle subwall 155 before closing against the top subwall 157.

FIG. 9 is a cross-sectional depiction of the right-hand side walls 108, 118, 126 when the shelter 100 is placed in the lowered mode. Generally, a force denoted by arrow "F" is selectively applied by a lifting mechanism to the top section 106 (which includes the top side wall 126) to move it vertically upward in relation to the middle section 104 (which includes middle side wall 118) and the bottom section 102 (which includes bottom side wall 108). That is, force F from the lifting mechanism moves the top section 106 upward, through the open-top of the bottom section 102's frame.

The top side wall 126 includes an upwardly-directed engagement feature 160, and the middle side wall 118 includes a downwardly-directed engagement feature 162. In these illustrative embodiments the engagement features 160, 162 are arcuate hook shapes, but the contemplated embodiments are not so limited. In alternative embodiments of this technology the engagement features can be other shapes such as, but not limited to, right-angle shapes, U-shapes, V-shapes, and the like. Also, in these illustrative embodiments the engagement features 160, 162 are formed top and bottom portions of the respective top and middle side walls 118, 126. For example, in successful reductions to practice the side walls 118, 126 were constructed of ¼ inch thick steel, and the hook shaped engagement features 160, 162 were formed on the top and bottom by conventional metal forming processes. However, forming the engagement features 160, 162 at the top and bottoms are not limiting of the contemplated embodiments, because in alternative embodiments the engagement features can be formed by other portions of the top and middle side walls 118, 126 or they can be a component that is attached to the top and middle side walls 118, 126. Thinner metal can be used alternatively if less strength is needed than that of a storm shelter, such as where embodiments of this technology are employed to construct a safe for keeping valuables.

As the raising force F moves the top sidewall 126 upward, eventually its moving engagement feature 160 will contactingly engage the stationary engagement feature 162 of the middle side wall 118. At that point, provided the force F is adequate, further upward movement of the top side wall 126 will pull the middle sidewall 118 upward as well. Preferably, the lifting engagement features are provided on all four sides of the top section 106 and middle section 104 to best distribute the lifting force F pulling the middle section 104 through the stationary open-top of the bottom section 102.

The middle side wall 118 has another engagement feature 164 at its lower end, and the bottom side wall 108 has an engagement feature 166 at its upper end. As the lifting force F continues to pull the middle side wall 118 upward, eventually its engagement feature 164 will contactingly engage the engagement feature 166 and interlock therewith. Coinciding with that interlocking engagement, the lifting force F can be reduced to only a force necessary to maintain the shelter 100 in the raised mode, such as depicted in FIG. 1. FIG. 10 is a cross-sectional depiction of the interlocking nature of the engagement sections in the raised mode of the shelter 100.

To lower the shelter 100 from its raised mode, the lifting force F can be reduced enough such that it is overcome by the force of gravity. The top section 106 begins to lower under control of the reduced lifting force, and the middle section 104, remaining interlocked to the top section 106 by the engagement features 160, 162, will lower together with the top section 106 under the force of gravity. Interlocked together, the top section 106 lowers the middle section 104 through the open-top of the bottom section 102.

Eventually, the middle section 104 bottoms out on the same ground the bottom section 102 is anchored to, where it is nested within the bottom section. From that point on, the reduced lifting force lowers the top section 106 through the open-top of the middle section 104 until it, too, bottoms out, where it is nested within the middle section 104 and bottom section 102 in the lowered mode of the shelter 100.

FIG. 11 depicts a scissor lift 170 type of lifting mechanism suited for providing the lifting force F in accordance with illustrative embodiments of this technology to raise and lower the shelter 100. The scissor lift 170 has a lower scissor arm assembly 172 anchored to the ground like the bottom section 102 of the shelter 100. The scissor lift 170 also has an upper scissor arm assembly 176 attached to the top section 106 of the shelter 100. The scissor lift 170 also has a middle scissor arm assembly 174 connecting the upper and lower scissor arm assemblies 172, 176 together.

Going from the ground up, the lower scissor arm assembly 172 has scissor arms 178, 180 that are pinned at their upper ends to scissors arms 182, 184 of the middle arm assembly 174. The scissor arms 182, 184 have upper ends that are pinned to scissor arms 186, 188 of the upper scissor arm assembly 176. The upper ends of the scissor arms 186, 188 are pinned to a top bracket 192. The bottom of upper scissor arm assembly 176 and the top of the middle scissor arm assembly 174 are together constrained by a bottom bracket 190. Each bracket 190, 192 forms a slot 194, 196 permitting lateral displacements of the pinned connections constrained within them. Namely, the top end of the scissor arm 186 is free to move laterally within the constraint of the slot 196 in the top bracket 192. Likewise, the bottom end of the scissor arm 188 and the top end of the scissor arm 182, which are pinned together, are free to move laterally within the constraint of the slot 194 in the bottom bracket 190.

A pair of gearmotors 198, 200 are attached to the top section 106. Preferably, twelve-volt motors are used so they can be powered by a self-contained battery in the shelter 100. Each gearmotor 198, 200 drives a leadscrew 202, 204 that is threadingly coupled to a nut 206, 208 attached at opposing ends of the bottom bracket 190. Thus, simultaneous activation of the gearmotors 198, 200 alters the threaded disposition of the leadscrews 202, 204 relative to their respective nuts 206, 208. In the raised position of the shelter 100 depicted in FIG. 11, the nuts 206, 208 are engaging the distal ends of the leadscrews 202, 204. The gearmotors can be deactivated, such as by a limit switch or a proximity switch and the like, when this raised position of the shelter 100 is achieved.

The nuts 206, 208 bearing against the respective leadscrews 202, 204 produce the upward lifting force F that is sufficient to raise the top section 106, and by the interlocking relationship the middle section 104, to the raised mode. At this maximum separation of the brackets 190, 192, the left-side pinned ends of the top scissor assembly 176 are urged to the to the right-end of the slots 194, 196 in the brackets 190, 192, which increases the vertical stroke of the upper scissor arm assembly 176.

That raised mode is depicted diagrammatically in FIG. 12. In comparison, FIG. 13 similarly depicts a partial lowering of the shelter that is accomplished by powering the gearmotors 198, 200 to move the nuts 206, 208 to medial portions of the leadscrews 202, 204. Spinning the leadscrews 202, 204 to reduce the separation of the brackets 190, 192 results in lowering the upward lifting force F, causing the top section 106 to begin lowering. As the top section 106 lowers, note that the middle section 104 begins to lower into the bottom section 102. The bracket slots 194, 196 provide the left-hand side of the top scissor arm assembly 176 with lateral freedom of movement, equalizing stresses and strains during the downward movement.

FIG. 14 is another similar diagrammatic depiction of the shelter 100 when it is nearly at the lowered mode. Further activation of the gearmotors 198, 200 has moved the nuts 206, 208 near the opposing end of the respective leadscrews 202, 204. At this point in the lowering, the middle section 104 has bottomed out on the ground, leaving the top section 106 to lower through the open-top of the middle section 104. Continued activation of the gearmotors 198, 200 will ultimately lower the top section 106 flush with the bottom and middle sections 102, 104.

It is contemplated that preferably, the scissor arm solution would entail two scissor arm assemblies on opposing sides of the shelter 100, and the solution depicted in FIG. 14 would entail a gearmotor in each corner of the shelter. The gearmotors can be synchronized to keep the sections 102, 104, 106 level and square during the movements. Mechanical synchronization can be accomplished by training a timing chain collectively around the leadscrews. Electronic synchronization can be accomplished by using encoded gearmotors with processor-based timing control.

FIG. 15 is a simplified diagrammatic depiction of an alternative lifting mechanism constructed in accordance with alternative embodiments of this technology. The scissor lift assemblies of the previously discussed embodiments are replaced with extending the leadscrews 202', 204' all the way to ground, where they engage the respective leadscrew nuts 206, 208. Lowering the shelter 100 proceeds as described above, except that here openings 209 are required in the foundation and below for the leadscrews 202', 204' to move into as the leadscrew nuts 206, 208 are advanced toward the gearmotors 198, 200. FIG. 16 is similar to FIG. 15 but depicting the shelter 100 at a time when it has been partially lowered, resulting in the leadscrews 202', 204' advancing into the underground openings 209.

FIG. 17 depicts a lifting mechanism constructed in accordance with alternative embodiments of this technology. A motor/gearbox 230 drives a leadscrew 232 to advance or retract a block 234, depending on the direction of rotation. Advancement of the block 234 provides the lifting force F for raising and lowering the top section 106 as described above. This construction has utility in other applications as well, such as but not limited to raising and lowering overhead doors. FIG. 18 depicts a pulley system that cooperates with the lifting mechanism of FIG. 17 to raise and lower the shelter 100. A cable is attached to the block 234 producing the lifting force F. The cable from F is trained around pulley D and rigidly connected to the middle section 104 of the shelter. Another cable is attached to the middle section 104 at C, is trained around pulley B, and attached to the lower section 102 of the shelter 100 at A. The pulleys cooperatively reduce the amount of lifting force F necessary to raise the shelter 100.

Once the shelter 100 is fully raised, access into its secure enclosure is provided through the opening 158 spanning all three sections 102, 104, 106. As best shown in FIG. 1, the doors 136, 138, 140 can then be individually closed and securely latched. The door 140, for example, has two right-angle flanges 210 that are configured, when the door 140 is closed, to enter respective openings 212 formed in the side wall 126 of the third section 106. The flanges 210 form respective strike openings 214 that are sized to receive respective bolts in a latch mechanism 216.

FIG. 19 is an enlarged depiction of the latch mechanism 216 from the perspective of the front-side of the door 140. The latch mechanism includes a sliding actuator 218, here depicted in the unlatched position. FIG. 20 is similar to FIG. 19, but depicting the actuator 218 slid to the right in the latched position, where strikes 220 extend beyond the right-angle flanges 210. FIG. 21 depicts the back-side of the door 140, more particularly depicting how the strikes 220 align with the strike openings 214 in the right-angle flanges 210.

FIG. 22 is a top cross-sectional depiction showing how, when the latching mechanism 216 is latched, the door 140 is prevented from opening because the strike 220 extending through the strike opening 214 prevents withdrawal of the right-angle flange 210 from the opening 212 in the side wall 126.

Summarizing, the embodiments of this technology contemplate a storm shelter that is selectively positionable between an operable raised mode and an idle lowered mode. The shelter has an outer frame having a first upstanding perimeter wall defining an open top. An inner frame has a second upstanding perimeter wall nested within the first upstanding perimeter wall in the lowered mode. Means is provided for raising the inner frame through the outer frame's open top and above the outer frame in the raised mode. The "means for raising" includes the described embodiments of the lifting mechanisms, and structural equivalents thereof. For example, without limitation, the disclosed structure includes electric gearmotors for raising and lowering the inner frame, and can be assisted by scissor arm assemblies, pulley combinations, and the like. The skilled artisan readily recognizes that the "means for raising" also contemplates hand-operated structures that perform functionally the same as gearmotors except that a user's hand cranking replaces the electric motor's horsepower for performing work.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed:

1. A storm shelter that is selectively positionable between a raised mode and a lowered mode, comprising:
   a first frame having a first upstanding perimeter wall;
   a second frame having a second upstanding perimeter wall nested with the first upstanding perimeter wall in the lowered mode;
   a motor selectively rotating a leadscrew; and
   a scissor arm assembly having a first bracket attached to the second frame, a pair of scissor arms each pinned at one end to the first bracket, and a second bracket to which opposing ends of the scissor arms are pinned, and a leadscrew nut attached to the second bracket, wherein the leadscrew threadingly engages the leadscrew nut.

2. The storm shelter of claim 1 wherein the second frame is an innermost frame, further comprising an outermost frame having a third upstanding perimeter wall nested with the first upstanding perimeter wall in the lowered mode.

3. The storm shelter of claim 2 wherein the innermost frame defines a closed top.

4. The storm shelter of claim 2 wherein each upstanding perimeter wall defines a closeable opening.

5. The storm shelter of claim 4 wherein the closeable openings overlap each other.

6. The storm shelter of claim 5 comprising doors configured to close the closeable openings.

7. The storm shelter of claim 6 wherein the doors are attached to hinges on the upstanding perimeter walls, the hinges staggered with respect to each other.

8. The storm shelter of claim 2 comprising third and fourth interlocking engagement features supported by the first frame and the outermost frames, respectively, configured so that raising the first frame to the raised mode contactingly interlocks the third and fourth interlocking engagement features together.

9. The storm shelter of claim 2 comprising a wheeled storage container connected to the innermost frame.

10. The storm shelter of claim 2 wherein the second inner frame comprises a first interlocking engagement feature, wherein the inner frame comprises a second interlocking engagement feature, and wherein the means for raising comprises a drive configured to raise the second inner frame to contactingly engage the first and second interlocking engagement features together.

11. The storm shelter of claim 10 wherein the drive, after contactingly engaging the interlocking engagement features together, further raises the second inner frame which, in turn, raises the inner frame via the contactingly engaged interlocking features.

12. The storm shelter of claim 1 wherein the scissor arms are pinned in slots that are formed in the first and second brackets.

13. The storm shelter of claim 12 comprising a second pair of scissor arms pinned to ends of the first pair of scissor arms.

14. The storm shelter of claim 13 comprising a third pair of scissor arms pinned to ends of the second pair of scissor arms.

15. A method for selectively positioning a storm shelter between a raised mode and a lowered mode, comprising:
   obtaining a storm shelter with a first frame having a first upstanding perimeter wall, a second frame having a second upstanding perimeter wall nested with the first upstanding perimeter wall in the lowered mode, and a scissor arm assembly having a first bracket attached to the second frame, a pair of scissor arms each pinned at one end to the first bracket, and a second bracket to which opposing ends of the scissor arms are pinned, and a leadscrew nut attached to the second bracket, wherein the leadscrew threadingly engages the leadscrew nut; and
   selectively energizing a motor configured to rotate the leadscrew and position the storm shelter between the raised mode and the lowered mode.

* * * * *